United States Patent
Jiang (10) Patent No.: US 8,641,230 B1
(45) Date of Patent: Feb. 4, 2014

(54) ZOOM LENS SYSTEM FOR LED-BASED SPOTLIGHT

(71) Applicant: LedEngin, Inc., San Jose, CA (US)

(72) Inventor: Wu Jiang, Sunnyvale, CA (US)

(73) Assignee: Ledengin, Inc., San Jose, CA (US)

( * ) Notice: Subject to any disclaimer, the term of this patent is extended or adjusted under 35 U.S.C. 154(b) by 0 days.

(21) Appl. No.: 13/657,731

(22) Filed: Oct. 22, 2012

(51) Int. Cl.
*F21V 13/04* (2006.01)

(52) U.S. Cl.
USPC ............. 362/231; 362/235; 362/324; 264/1.7

(58) Field of Classification Search
USPC ....................... 362/231, 249.1, 249.3, 555, 85
See application file for complete search history.

(56) References Cited

U.S. PATENT DOCUMENTS

| | | | | |
|---|---|---|---|---|
| 2008/0030974 A1* | 2/2008 | Abu-Ageel | ...................... | 362/19 |
| 2012/0287621 A1* | 11/2012 | Lee et al. | ...................... | 362/231 |
| 2013/0120985 A1* | 5/2013 | Jiang et al. | ...................... | 362/235 |

* cited by examiner

Primary Examiner — Tracie Y Green
(74) Attorney, Agent, or Firm — Kilpatrick Townsend & Stockton LLP (57) ABSTRACT

Zoom lens systems for LED-based spotlights include a base lens and a disk lens. The base lens can be a TIR lens with convex microlenses on a front surface. The disk lens can be generally planar. A rear surface of the disk lens can have concave microlenses complementary to the microlenses on the front surface of the base lens. A front surface of the disk lens can have convex microlenses with a different geometry from the microlenses on the front surface of the base lens. The disk lens can be movable relative to the base lens from a narrow-angle position in which a rear surface of the disk lens is in contact with a front surface of the base lens to a wide-angle position in which the rear surface of the disk lens is separated from the front surface of the base lens.

20 Claims, 7 Drawing Sheets

ZOOM LENS SYSTEM FOR LED-BASED SPOTLIGHT

BACKGROUND OF THE INVENTION

The present disclosure relates generally to lighting apparatus and in particular to a zoom lens system for an LED-based spotlight.

The spotlight is a well-known tool in theatrical productions, allowing a bright light to selectively illuminate a portion of the stage (e.g., where an actor is performing) while leaving the rest of the stage less brightly lit. A conventional spotlight includes a light source disposed within a concave (e.g., parabolic) holder, the inner surface of which is coated with reflective material so as to maximize light output. A focusing lens is placed in front of the opening of the concave holder to enhance directionality of the emerging light beam. Some spotlight assemblies allow the focusing lens to be moved along the optical axis to change the beam angle (and the resulting spot size on the stage), providing a "zoom" effect.

Conventional spotlights are made for conventional light sources, such as incandescent or halogen lamps. With the desire for more energy-efficient lighting, there is a demand for spot lights that use more efficient light sources. Light-emitting diodes (LEDs) are an emerging lighting technology. However, whereas conventional lamps tend to illuminate a wide angle, LEDs tend to produce light in a preferred direction (e.g., from the top surface of the diode). Consequently, optical systems such as spotlights that are designed for conventional light sources may not be optimal for use with LED-based light sources.

BRIEF SUMMARY OF THE INVENTION

Embodiments of the present invention provide zoom lens systems for LED-based spotlights. The lens system can include a total internal reflection (TIR) lens, also referred to herein as a "base" lens, paired with a second lens, also referred to herein as a "disk" lens. In an assembly, the base lens and the disk lens are positioned along a common optical axis, and the disk lens is movable relative to the base lens from a narrow-angle position in which a rear surface of the disk lens is in contact with a front surface of the base lens to a wide-angle position in which the rear surface of the disk lens is separated from the front surface of the base lens.

In some embodiments, the base lens is substantially cylindrically symmetric with respect to the optical axis, and its outer surface has a tapered shape along the optical axis such that the base lens is wider at one end (the front surface) than at the other (the rear surface). The tapered shape provides total internal reflection, directing light from a light source positioned near the narrower end toward the wider end. The front surface is patterned with convex microlenses, which can be, e.g., hexagonal regions of surface curvature that tile the front surface. The rear surface of the base lens can have a substantially cylindrical opening formed therein that extends along the optical axis partway through the lens. A portion of the inner surface of the substantially cylindrical opening is transverse to the optical axis, and that portion can also be patterned with convex microlenses.

In some embodiments, the disk lens has front and rear surfaces that are generally planar and parallel to each other. Each surface can have a circular active area with a diameter matching that of the front surface of the base lens. The rear surface of the disk lens can be patterned with concave microlenses that complement the microlenses on the front surface of the base lens, so that when the two lenses are placed in contact, there is substantially no air gap between them. The front surface of the disk lens can be patterned with convex microlenses, which can have a different geometry (e.g., different size, radius of curvature, etc.) from those on the front surface of the base lens.

Certain aspects of the invention relate to lens systems having a base lens element and a disk lens element. The base lens element can have a front surface with convex microlenses formed thereon and a rear surface having a substantially cylindrical cavity formed therein. The cavity sidewall can extend partway toward the front surface and terminate at an inner transverse surface parallel to the front surface. The outer sidewall of the base lens can be shaped to provide total internal reflection of light from a light source at the opening of the cavity. The disk lens element can have a front planar surface having convex microlenses formed thereon. A rear planar surface parallel to the front surface can have concave microlenses formed therein such that the concave microlenses of the rear planar surface are complementary to the convex microlenses of the front surface of the base lens element.

The microlenses can have various geometries. In some embodiments, the microlenses are hexagonal and tile the surface. Each set of microlenses can have a different microlens size, and in some embodiments, the convex microlenses of the front surface of the base lens element are larger than the convex microlenses of the front surface of the disk lens element. Each set of microlenses can also have a radius of curvature, and in some embodiments the convex microlenses of the front surface of the disk lens element have a larger radius of curvature than the convex microlenses of the front surface of the base lens element.

In some embodiments, the inner sidewall and the outer sidewall of the base lens element are shaped so as to provide mixing of light from a plurality of light emitting diodes within a light source. For further light mixing, the inner transverse surface of the cavity in the base lens element can also have convex microlenses formed thereon. In addition, the inner transverse surface of the cavity in the base lens element and/or the sidewall of the cavity in the base lens element can be frosted.

In various embodiments, the lens elements can be made of poly(methylmethacrylate) or any other optically transparent material.

Lens systems in accordance with the present invention can be incorporated into a spotlight assembly. For example, the base lens element and the disk lens element can be mounted in a holder such that the base lens element and the disk lens element have a common optical axis and at least one of the base lens element or the disk lens element is movable along the optical axis relative to the other of base lens element or the disk lens element, thereby allowing the separation distance between the lens elements to be varied. A light emitter having multiple light emitting diodes (LEDs) arranged on a substrate can be disposed adjacent to the rear surface of the base lens (e.g., at the entrance to the cavity). The base lens element and the disk lens element (in particular the side walls and microlenses) are shaped such that a light beam produced by the spotlight assembly has a variable beam width dependent on a separation distance between the base lens element and the disk lens element. In some embodiments, the variable beam width is at a minimum value when the disk lens element is in contact with the base lens element and wherein the minimum value is less than 10° full width at half maximum (e.g., 8°).

The following detailed description together with the accompanying drawings will provide a better understanding of the nature and advantages of the present invention.

DETAILED DESCRIPTION OF THE INVENTION

Embodiments of the present invention provide zoom lens systems for LED-based spotlights. The lens system can include a total internal reflection (TIR) lens, also referred to herein as a "base" lens, paired with a second lens, also referred to herein as a "disk" lens. In an assembly, the base lens and the disk lens are positioned along a common optical axis, and the disk lens is movable relative to the base lens from a narrow-angle position in which a rear surface of the disk lens is in contact with a front surface of the base lens to a wide-angle position in which the rear surface of the disk lens is separated from the front surface of the base lens.

In some embodiments, the base lens is substantially cylindrically symmetric with respect to the optical axis, and its outer surface has a tapered shape along the optical axis such that the base lens is wider at one end (the front surface) than at the other (the rear surface). The tapered shape provides total internal reflection, directing light from a light source positioned near the narrower end toward the wider end. The front surface is patterned with convex microlenses, which can be, e.g., hexagonal regions of surface curvature that tile the front surface. The rear surface of the base lens can have a substantially cylindrical opening formed therein that extends along the optical axis partway through the lens. A portion of the inner surface of the substantially cylindrical opening is transverse to the optical axis, and that portion can also be patterned with convex microlenses.

In some embodiments, the disk lens has front and rear surfaces that are generally planar and parallel to each other. Each surface can have a circular active area with a diameter matching that of the front surface of the base lens. The rear surface of the disk lens can be patterned with concave microlenses that complement the microlenses on the front surface of the base lens, so that when the two lenses are placed in contact, there is substantially no air gap between them. The front surface of the disk lens can be patterned with convex microlenses, which can have a different geometry (e.g., different size, radius of curvature, etc.) from those on the front surface of the base lens.

Figure 1A:
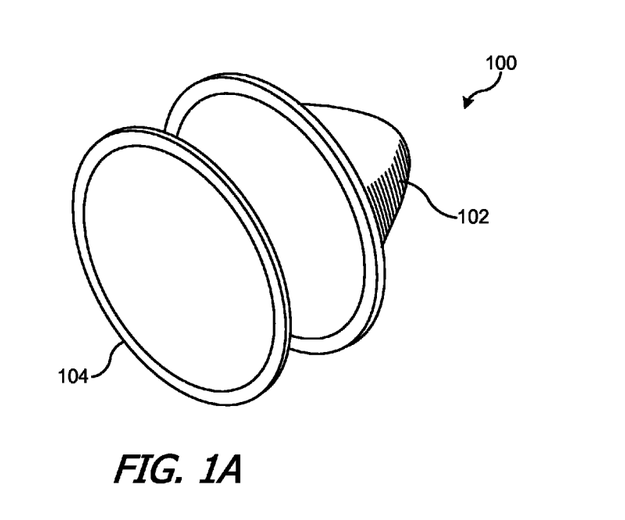
FIGS. 1A and 1B are, respectively, a perspective view and a side view of a lens system according to an embodiment of the present invention.
Figure 1B:
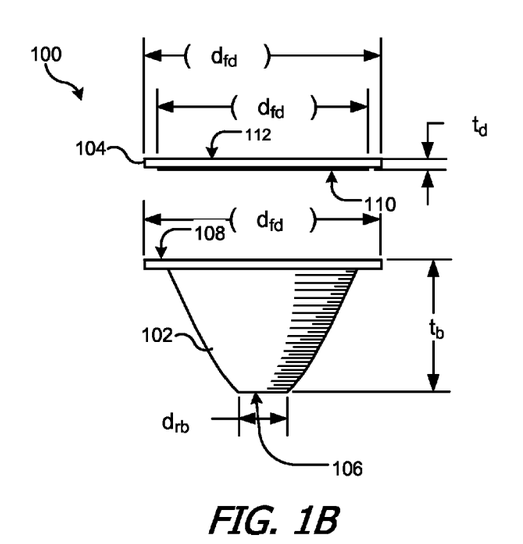

FIGS. 1A and 1B are, respectively, a perspective view and a side view of a lens system 100 according to an embodiment of the present invention. Lens system 100 includes a base lens element 102 and a disk lens element 104. Base lens element 102 has a rear surface 106 and a front surface 108. Disk lens element 104 has a rear surface 110 and a front surface 112.

For purposes of illustration, it is assumed that lens system 100 is to be used with a light source that is an LED emitter structure with a number of LED dice of different colors (e.g., red, blue, green, white, and/or other colors) arranged thereon, in order to produce a spot light of uniform color and variable beam width over some desired range of beam width (e.g., 8 degrees to 40 degrees). Where a multicolor LED emitter is used, it is desirable for lens system 100 to provide color mixing such that the output light beam has good color uniformity across its width, in addition to providing focusing. These goals can be achieved by shaping base lens element 102 and disk lens element 104 as described herein.

The dimensions of base lens element 102 and disk lens element 104 can be chosen based on the particular characteristics of the light source and desired properties of the resulting spotlight. For example, in one embodiment, base lens element 102 has a thickness ($t_b$) of about 25 mm, a rear-surface diameter ($d_{rb}$) of about 9 mm, and a front-surface diameter ($d_{rf}$) of about 45 mm. Disk lens element 104 can have a thickness ($t_d$) of about 2 mm, a front-surface diameter ($d_{fd}$) of about 45 mm, and a rear-surface active diameter ($d_{rd}$) of about 40 mm. These dimensions are provided for purposes of illustration and can be varied as desired, depending, e.g., on the size of the LED emitter that is to be used as a light source and the desired size of the spotlight assembly.

Lens elements 102 and 104 can be made of any suitable optically transparent material. In some embodiments, a conventional optical plastic such as a poly(methylmethacrylate) (PMMA) is used; other optically transparent plastics or glass may also be used. Lens elements 102 and 104 can be manufactured, e.g., using conventional techniques for fabricating plastic articles, such as molding.

In operation, light from a light source enters through an opening (not shown in FIG. 1) in rear surface 106 of base lens element 102 and is directed out through front surface 108 and onto rear surface 110 of disk lens element 104. The light passes through disk lens element 104 and exits front surface 112.

Surfaces of the lens elements are advantageously shaped using microlenses to provide color mixing and directionality to the emerging light; specific examples of surface shaping are described below. Consequently, light exiting front surface 112 can be collimated to at least some degree. In some embodiments, the beam angle varies with the distance between disk lens element 104 and base lens element 102, with smaller distances between the lens elements produce narrower beams. For example, in one embodiment, the angle of the light beam (measured as full width at half maximum intensity, or FWHM) ranges from about 8° when disk lens element 104 is placed in contact with base lens element 102 to about 40° when disk lens element 104 is placed about 17 mm above front surface 108 of base lens element 102.

Figure 2:
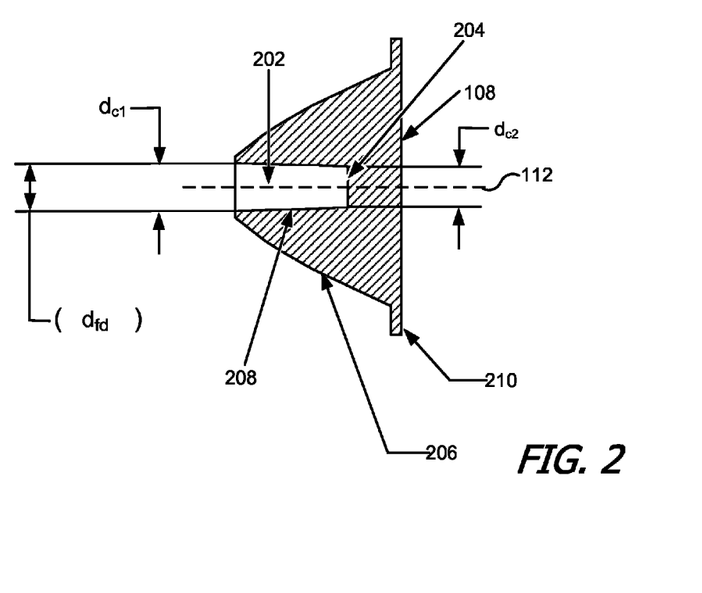
FIG. 2 is a side cross-section view of a base lens element according to an embodiment of the present invention.

FIG. 2 is a side cross-section view of base lens element 102 according to an embodiment of the present invention. A generally cylindrical cavity 202 having an inner side wall 208 can be formed in rear surface 106, extending partway toward front surface 108 as shown. An inner transverse surface 204 (transverse to the optical plane) is defined at the front end of cavity 202. As described below, a light source can be placed at the opening of cavity 202.

Base lens element 102 can be a total internal reflection (TIR) lens. For example, the outer side surface 206 of base lens element 102 is advantageously shaped to direct light from a light source placed at the opening of cavity 202 toward front surface 108, using total internal reflection. In some embodiments, the shape of side surface 206 can be described by the following equation in cylindrical coordinates (r, z), where z is the longitudinal coordinate along optical axis 112 and r is the radial coordinate representing distance from optical axis 112:

$$z = \frac{cr^2}{1 + \sqrt{1 - (1+k)c^2 r^2}}. \quad (1)$$

In Eq. (1), c (curvature) and k (conic constant) are parameters that can be adjusted to optimize total internal reflection and/or light output for a particular light source. In one embodiment optimized for use with a four-LED emitter, c=0.22072 and k=−1.1343. These values may be varied for other applications; for instance, they can be optimized for particular light sources. In some embodiments, the z=0 plane (the vertex of the conic described by Eq. (1)) does not precisely coincide with rear surface 106 of base lens element 102. For example, in one embodiment optimized for the same four-LED emitter, the z=0 plane is about 2.22 mm behind rear surface 106.

The thickness $t_b$ (see FIG. 1B) of base lens element 102 can be chosen to optimize light output. In one embodiment, base lens element 102 is about 25 mm thick.

Inner side wall 208 of cavity 202 is also substantially symmetric about optical axis 112. Inner side wall 208 may have a slight taper (e.g., an inward angle of approximately 1°, 3°, 5°, or the like) to facilitate manufacturing; thus, for example, cavity 202 may be slightly wider at rear surface 106 than at inner transverse surface 204. In some embodiments, the presence of cavity 202 provides enhanced light reflection and collimation of light in the central region, as well as mixing of light from multiple LEDs within a single light source to improve uniformity of light output.

The radius (or diameter) of cavity 202 can be chosen to optimize light output, subject to the constraint that for any particular z within base lens element 102, the radius of cavity 202 must be smaller than the radius r that satisfies Eq. (1). In one embodiment, cavity 202 has a diameter (twice the radius) of about 9.1 mm ($d_{c1}$) at rear surface 106 and about 6.2 mm ($c_{c2}$) at inner transverse surface 204. The depth of cavity 202 can be, for example, 17.6 mm.

In some embodiments, inner side wall 208 and/or inner transverse surface 204 can be frosted, e.g., by applying fine textures to the corresponding surfaces of a mold used to fabricate base lens element 102. Either or both of inner side wall 208 and inner transverse surface 204 can be frosted or unfrosted as desired. For example, inner transverse surface 204 can be frosted while inner side wall 208 is not frosted, or both inner transverse surface 204 and inner side wall 208 can be frosted. Where used, frosting of these surfaces can improve light mixing but may reduce optical efficiency due to increased scattering off a frosted surface.

As shown in FIG. 2, a flange 210 can be formed around the outer periphery of base lens element 102 at front surface 108.

Flange 210 advantageously does not affect the optical properties but can provide mechanical support, e.g., for mounting base lens 102 in a lens holder.

Figure 3:
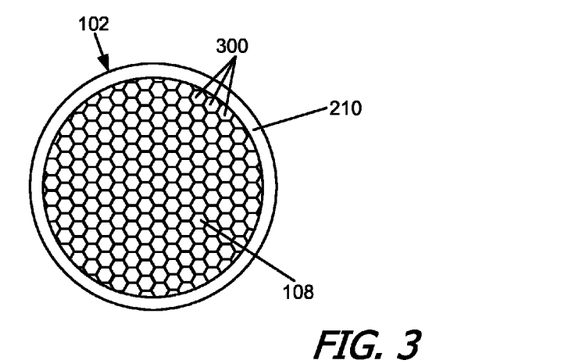
FIG. 3 is a front view of a front surface of a base lens element according to an embodiment of the present invention.

FIG. 3 is a front view of front surface 108 of base lens element 102 according to an embodiment of the present invention. Except for the region of flange 210, in this embodiment, front surface 108 is patterned with convex microlenses 300. In this embodiment, microlenses 300 are hexagonal and closely packed, tiling front surface 108 in a honeycomb pattern. Other patterns may also be substituted.

As used herein, the "active" portion of a surface refers to the portion of that surface that is patterned with microlenses. This can be all or part of the surface. As can be seen in FIG. 3, the region of flange 210 is not patterned with microlenses. Accordingly, the active portion of front surface 108 can have a diameter be less than the physical diameter. For instance, the active diameter can be about 40 mm while the physical diameter (corresponding to $d_{fb}$ in FIG. 1B) is about 45 mm.

Figure 4:
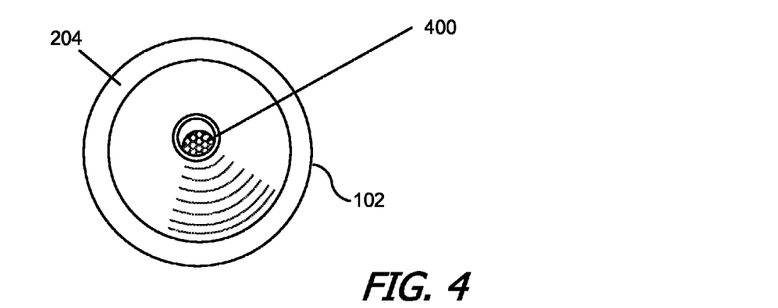
FIG. 4 is a rear perspective view of a base lens element according to an embodiment of the present invention.

FIG. 4 is a rear perspective view of base lens element 102, showing inner transverse surface 204. As can be seen, inner transverse surface 204 (but not cavity sidewall 208) is also patterned with convex microlenses 400. In this embodiment, microlenses 400 are hexagonal and closely packed, tiling inner transverse surface 204 in a honeycomb pattern. Other patterns may also be substituted.

Figure 5A:
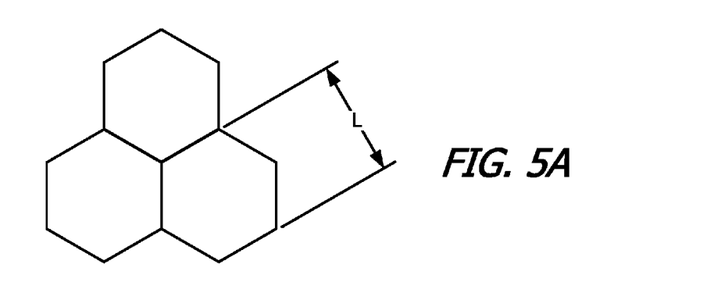
FIGS. 5A and 5B are, respectively, a front view and a side view of a small number of convex microlenses as used in some embodiments of the present invention, illustrating design parameters.
Figure 5B:
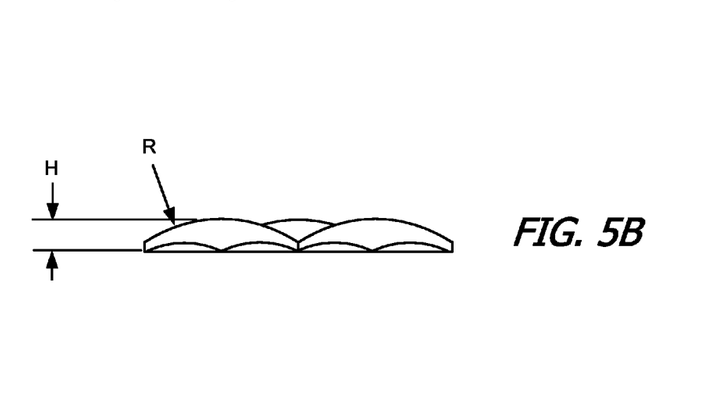

Microlenses 300 and 400 can be characterized by design parameters. By way of illustration, FIGS. 5A and 5B are, respectively, a front view and a side view of a small number of convex microlenses 500 as used in some embodiments of the present invention. As shown in FIG. 5A, each microlens 500 can be a regular hexagon with a lateral dimension L. As shown in FIG. 5B, each microlens 500 can have a radius of curvature R and a height H.

The parameters L, R and H can be varied to produce different effects, and different convex microlens surfaces in a given lens system can use different values for L, R and H. For example, in one embodiment, front surface 108 of base lens element 102 has $L_{fb}$=4.378 mm, $R_{fb}$=4.00 mm, and $H_{fb}$=0.90 mm, while inner transverse surface 204 has $L_{ib}$=1.684 mm, $R_{ib}$=4.00 mm, and $H_{ib}$=0.12 mm. It is to be understood that other parameters can be substituted, and that optimal parameters may be depend on the particular light source with which the lens system is to be used and/or desired characteristics of the output beam.

Figure 6:
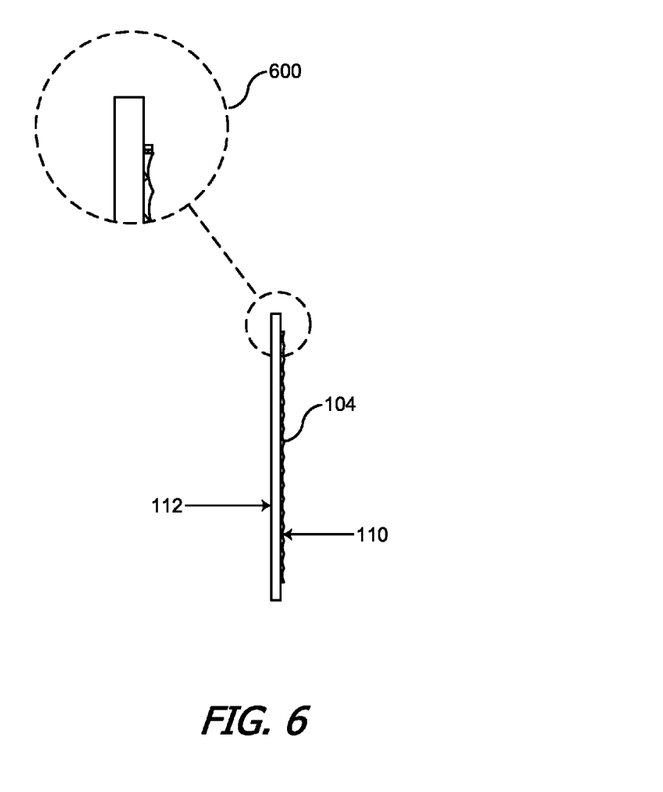
FIG. 6 is a side view of a disk lens element according to an embodiment of the present invention.
Figure 7:
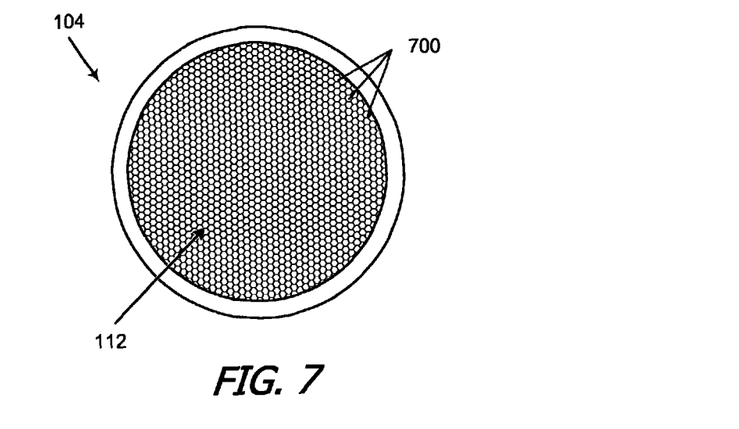
FIG. 7 is a front view of a disk lens element according to an embodiment of the present invention.
Figure 8:
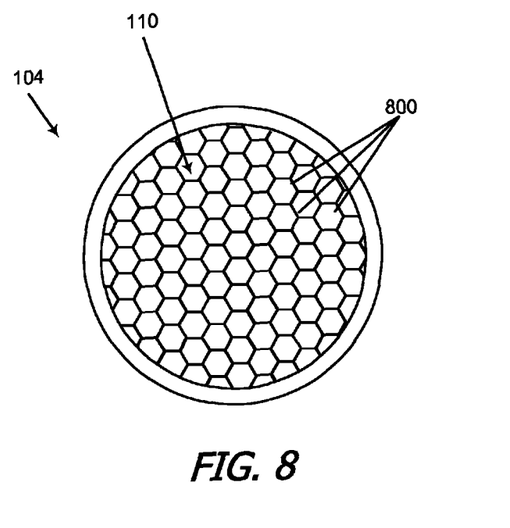
FIG. 8 is a rear view of a disk lens element according to an embodiment of the present invention.

Disk lens element 104 will now be described. FIGS. 6-8 are, respectively, a side view, a front view, and a rear view of disk lens element 104 according to an embodiment of the present invention. As shown in FIG. 6, disk lens element 104 is generally planar, with front surface 112 substantially parallel (within manufacturing tolerances) to rear surface 110. As shown in FIGS. 7 and 8, each of front surface 112 (FIG. 7) and rear surface 110 (FIG. 8) is patterned with microlenses 700, 800. The microlenses can extend to a diameter that matches the active diameter of base lens element 102, and a flange 602 can be formed around the outer periphery of disk lens element 104. Flange 602, which advantageously does not affect the optical properties of base lens element 102, can be used to provide mechanical support, e.g., for mounting disk lens element 104 in a lens holder.

Referring to FIG. 7, microlenses 700 on front surface 112 can be convex microlenses generally similar to microlenses 500 shown in FIGS. 5A and 5B, but with different values for one or more of the design parameters L, R and H. For example, in one embodiment of disk lens element 104, front-surface microlenses 700 have the following parameters: $L_{fd}$=1.024 mm, $R_{fd}$=7.00 mm, and $H_{fd}$=0.025 mm. It is to be understood that other parameters can be substituted, and that optimal parameters may depend on the light source and desired characteristics of the output beam.

Figure 9A:
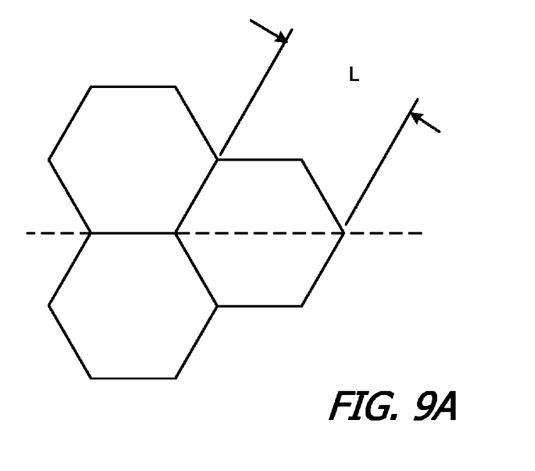
FIGS. 9A and 9B are, respectively, a front view and a side view of a small number of concave microlenses as used in some embodiments of the present invention, illustrating design parameters.
Figure 9B:
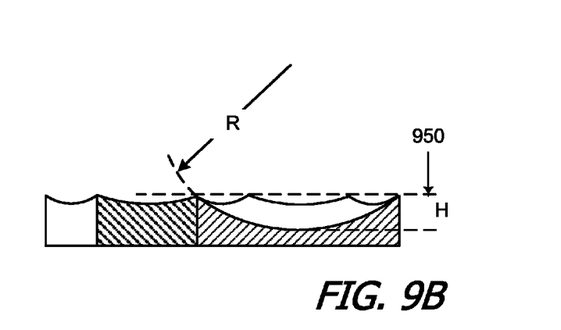

Referring to FIG. 8, microlenses 800 on rear surface 112 can be concave microlenses. FIGS. 9A and 9B are, respectively, a front view and a side view of a small number of concave microlenses 900 as used in some embodiments of the present invention. As shown in FIG. 9A, each concave microlens 900 can be a regular hexagon with a lateral dimension L. As shown in FIG. 9B, each concave microlens 900 can have a radius of curvature R and a height H. Because the lenses are concave, the "height" in this instance corresponds to an inward departure from a reference surface 950 of the lens. This inward departure is also illustrated in FIG. 6, where inset 600 shows the shaping of a portion of rear surface 110.

In some embodiments, concave microlenses 800 on rear surface 110 of disk lens element 104 have the same parameter values L, R and H as the convex microlenses 300 on front surface 108 of base lens element 102 and are arranged so that concave microlenses 800 are complementary to convex microlenses 300. Where this is the case, it is possible to bring front surface 108 into contact with rear surface 110 such that any gaps between the surfaces are negligible.

Lens elements 102 and 104 provide a lens system that can redirect and focus light from an LED-based emitter to provide a spotlight with variable spot size and high optical efficiency. Accordingly, lens system 100 of FIGS. 1A-1B can be incorporated into a spotlight assembly.

Figure 10A:
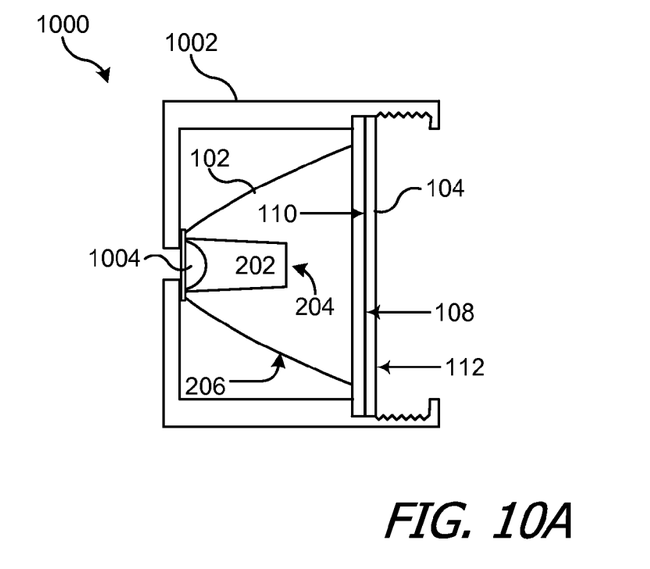
FIGS. 10A and 10B are simplified side cross-section views of a spotlight assembly incorporating lens system according to an embodiment of the present invention, illustrating different relative positions of a base lens element and a disk lens element.
Figure 10B:
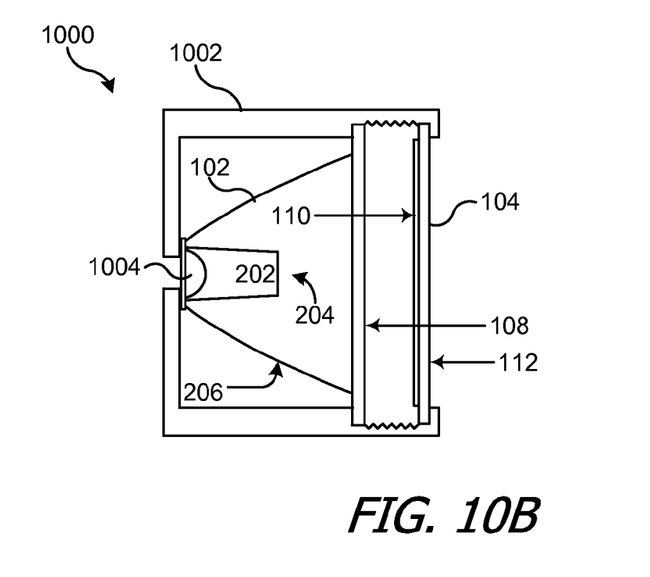

FIGS. 10A and 10B are simplified side cross-section views of a spotlight assembly 1000 incorporating lens system 100 according to an embodiment of the present invention. Assembly 1000 includes a holder 1002 that holds base lens element 102 and disk lens element 104 in a desired relative position.

A light emitter 1004 is placed at the opening of cavity 202 and oriented to direct light into base lens element 102. In some embodiments, light emitter 1004 can be an LZ4 RGBW emitter manufactured by LedEngin, Inc., of San Jose, Calif., assignee of the present application. The LZ4 RGBW emitter provides four independently addressable LED dice (one each in red, green, blue, and white) arranged in a 2×2 grid on a ceramic substrate and covered by a generally spherical primary lens. It is to be understood that other LED-based emitters can also be used.

In base lens element 102, outer surface 206 is shaped to provide total internal reflection, preventing light loss and facilitating color mixing from different LEDs in emitter 1004. Cavity 202 tends to collimate light in the central region. Microlenses 400 on inner transverse surface 204 (shown, e.g., in FIG. 4) further facilitate color mixing. Microlenses 300, 700 and 800 on surfaces 108, 110 and 112 operate to distribute light uniformly and shape the light beam to provide the desired area of illumination. The dimensions and shaping of microlenses 300, 700 and 800 can be chosen as desired, based on considerations such as the light source, the degree of beam collimation desired, and so on.

The degree of beam collimation can be further controlled by varying the position of disk lens element 104 relative to base lens element 102. To provide this "zoom" capability, base lens element 102 can be fixedly mounted in holder 1002 while disk lens element 104 is movably mounted. (Alternatively, disk lens element 104 can be fixedly mounted while base lens element 102 and the emitter are together movably mounted, or both lens elements can be movably mounted.) FIGS. 10A and 10B illustrate disk lens element 104 in different positions relative to base lens element 102, and it is to be understood that disk lens element 104 can be placed in other positions as well, including positions intermediate between those shown. Details of the movable mounting are not shown; conventional mechanisms for movably mounting lenses can be used.

In some embodiments of the present invention, moving disk lens element 104 closer to base lens element 102 results in a narrower beam, while moving disk lens element 104 farther from base lens element 102 results in a wider beam. The narrowest beam is achieved when disk lens element 104 is in contact with base lens element 102, as shown in FIG. 10A. As described above, convex microlenses 300 on front surface 108 of base lens element 102 and concave microlenses 800 on rear surface 110 of disk lens element 104 are advantageously complementary, allowing surfaces 108 and 110 to be placed in contact with negligible or no gaps between them. In this configuration, microlenses 300 and 800 have negligible effect on the beam width. Consequently, the narrowest beam angle achievable in a given embodiment can be determined primarily by the parameters of microlenses 700 on front surface 112 of disk lens element 104, and design parameters for microlenses 700 can be selected with a target beam angle in mind. In one embodiment using parameters described above, the arrangement shown in FIG. 10A produces a beam width (FWHM) of about 8° with optical transmission efficiency exceeding 80%.

Moving disk lens element 104 away from base lens element 102 results in increasing beam width due to the effect of microlenses 300 and 800. While there is no inherent limit on the maximum distance between disk lens element 104 and base lens element 102, in practice a given holder 1002 will generally limit the travel of disk lens element 104 to a prescribed range. In addition, the effect of disk lens element 104 tends to diminish with increasing separation distances from base lens element 102, and as a practical matter a point can be reached beyond which further increases in separation distance have negligible effect on beam width.

Consequently, the maximum separation distance is a matter of design choice and depends on the holder design. In some embodiments, this maximum distance can be selected based on the desired maximum beam width. For example, in one embodiment, placing disk element 104 at a distance of 17 mm from base lens element 102 (as shown in FIG. 10B) results in a beam width of about 40°, again with optical transmission efficiency exceeding 80%.

Thus, spotlight assembly 1000 can provide a spotlight with beam width varying from about 8° to about 40°, with high optical transmission efficiency (over 80%) throughout the entire range. This range is considered sufficient for theatrical applications, but spotlight assemblies incorporating lenses as described herein are not limited to any particular application. In addition to theatrical lighting, such assemblies can be used for architectural lighting and other applications.

It will be appreciated that lens system 100 described herein is illustrative and that variations and modifications are possible. The size, shape, and curvature of base lens element 102 and disk lens element 104 can be varied. Different patterns of microlenses can be used on the various surfaces. As noted above, the size and shape of the various components can advantageously be optimized for a particular light source and lamp form factor. Flanges and other components that do not affect the optical properties can be modified or omitted as desired. Lenses can be constructed with a variety of form factors, depending in part on the particular light source and desired optical properties (e.g., minimum and/or maximum beam width).

Lens systems described herein provide spotlights with variable beam width, optimized for use with LED-based emitters that include multiple LEDs, which can produce light of different colors (e.g., red, green, blue, warm white, cool white, etc.). In addition to providing high optical efficiency, the lens systems described herein can provide good color mixing in the case of an emitter with multi-colored LEDs used to produce white light or light of some intermediate color (e.g., a purple spotlight can use primarily red and blue LEDs).

While the invention has been described with respect to specific embodiments, one skilled in the art will recognize that numerous modifications are possible. For example, although certain embodiments described herein may make reference to particular parameter values optimized for use with specific emitters, those skilled in the art with access to the present disclosure will recognize that the design parameters can be varied to optimize for different emitters. Accordingly, all examples described herein are intended as illustrative and not limiting.

Thus, although the invention has been described with respect to specific embodiments, it will be appreciated that the invention is intended to cover all modifications and equivalents within the scope of the following claims.

What is claimed is:

1. A lens system comprising:
   a base lens element having:
      a front surface having a plurality of convex microlenses formed thereon;
      a rear surface having a substantially cylindrical cavity formed therein, the substantially cylindrical cavity having a sidewall extending partway toward the front surface and an inner transverse surface parallel to the front surface; and
      an outer sidewall shaped to provide total internal reflection of light from a light source at the opening of the substantially cylindrical cavity; and
   a disk lens element having:
      a front planar surface having a plurality of convex microlenses formed thereon; and
      a rear planar surface parallel to the front surface, the rear planar surface having a plurality of concave microlenses formed therein such that the concave microlenses of the rear planar surface are complementary to the convex microlenses of the front surface of the base lens element.

2. The lens system of claim 1 wherein the inner transverse surface has a plurality of convex microlenses formed thereon.

3. The lens system of claim 1 wherein the convex microlenses of the front surface of the base lens element are larger than the convex microlenses of the front surface of the disk lens element.

4. The lens system of claim 3 wherein the convex microlenses of the front surface of the disk lens element have a larger radius of curvature than the convex microlenses of the front surface of the base lens element.

5. The lens system of claim 1 wherein the convex microlenses and the concave microlenses are hexagonal.

6. The lens system of claim 1 wherein the inner sidewall and the outer sidewall of the base lens element are shaped so as to provide mixing of light from a plurality of light emitting diodes within a light source.

7. The lens system of claim 1 wherein the base lens element and the disk lens element are made of poly(methylmethacrylate).

8. The lens system of claim 1 wherein the sidewall of the cylindrical cavity is at an angle of less than 5° to the optical axis.

9. The lens system of claim 1 wherein the sidewall of the cavity in the base lens element is frosted.

10. The lens system of claim 1 wherein the inner transverse surface of the cavity in the base lens element is frosted.

11. The lens system of claim 1 wherein the sidewall and the inner transverse surface of the cavity in the base lens element are frosted.

12. A spotlight assembly comprising:
   a holder;
   a base lens element mounted in the holder, the base lens element having:
      a front surface having a plurality of convex microlenses formed thereon;
      a rear surface having a substantially cylindrical cavity formed therein, the substantially cylindrical cavity having a sidewall extending partway toward the front surface and an inner transverse surface parallel to the front surface; and
      an outer sidewall shaped to provide total internal reflection of light from a light source at the opening of the substantially cylindrical cavity;
   a disk lens element mounted in the holder such that the base lens element and the disk lens element have a common optical axis and one of the base lens element or the disk lens element is movable along the optical axis relative to the other of base lens element or the disk lens element, the disk lens element having:
      a front planar surface having a plurality of convex microlenses formed thereon; and
      a rear planar surface parallel to the front surface, the rear planar surface having a plurality of concave microlenses formed therein such that the concave microlenses of the rear planar surface are complementary to the convex microlenses of the front surface of the base lens element; and
   a light emitter having a plurality of light emitting diodes (LEDs) arranged on a substrate, the emitter disposed adjacent to the rear surface of the base lens.

13. The spotlight assembly of claim 12 wherein the convex microlenses of the front surface of the base lens element are larger than the convex microlenses of the front surface of the disk lens element.

14. The spotlight assembly of claim 12 wherein the convex microlenses of the front surface of the disk lens element have a larger radius of curvature than the convex microlenses of the front surface of the base lens element.

15. The spotlight assembly of claim 12 wherein the convex microlenses and the concave microlenses are hexagonal.

16. The spotlight assembly of claim 12 wherein the plurality of LEDs include LEDs that emit light of at least two different colors.

17. The spotlight assembly of claim 16 wherein the inner sidewall and the outer sidewall of the base lens element are shaped so as to provide mixing of light from a plurality of light emitting diodes within a light source.

18. The spotlight assembly of claim 12 wherein the inner transverse surface has a plurality of convex microlenses formed thereon.

19. The spotlight assembly of claim 12 wherein the base lens element and the disk lens element are shaped such that a light beam produced by the spotlight assembly has a variable beam width dependent on a separation distance between the base lens element and the disk lens element.

20. The spotlight assembly of claim 19 wherein the variable beam width is at a minimum value when the disk lens element is in contact with the base lens element and wherein the minimum value is less than 10° full width at half maximum.

* * * * *